United States Patent
Wottrich et al.

(10) Patent No.: US 9,631,650 B2
(45) Date of Patent: Apr. 25, 2017

(54) FASTENING DEVICE

(71) Applicant: Hilti Aktiengesellschaft, Schaan (LI)

(72) Inventors: Alexander Wottrich, Feldkirch (AT); Ralph Lippuner, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/399,127

(22) PCT Filed: May 14, 2013

(86) PCT No.: PCT/EP2013/059926
§ 371 (c)(1),
(2) Date: Nov. 5, 2014

(87) PCT Pub. No.: WO2013/174677
PCT Pub. Date: Nov. 28, 2013

(65) Prior Publication Data
US 2015/0101154 A1  Apr. 16, 2015

(30) Foreign Application Priority Data
May 21, 2012  (DE) .................. 10 2012 208 482

(51) Int. Cl.
| F16B 37/04 | (2006.01) |
| F16B 37/08 | (2006.01) |
| F16B 2/04 | (2006.01) |
| F16B 37/02 | (2006.01) |
| F16B 37/00 | (2006.01) |
| F16B 7/18 | (2006.01) |

(52) U.S. Cl.
CPC ............... *F16B 2/04* (2013.01); *F16B 37/00* (2013.01); *F16B 37/02* (2013.01); *F16B 37/045* (2013.01); *F16B 7/185* (2013.01); *F16B 37/046* (2013.01); *Y10T 24/3427* (2015.01)

(58) Field of Classification Search
CPC ........ F16B 37/045; F16B 37/046; F16B 7/04; F16B 5/06; F16B 2/02; F16B 37/0807
USPC ......... 411/81, 84, 85, 90, 95, 104, 105, 112; 248/65, 222.14, 225.11, 499
See application file for complete search history.

(56) References Cited

U.S. PATENT DOCUMENTS

| 4,723,865 A | 2/1988 | Rochau | |
| 5,489,173 A * | 2/1996 | Hofle | F16B 37/046 411/104 |
| 5,655,865 A * | 8/1997 | Plank | E04D 3/08 411/85 |

(Continued)

FOREIGN PATENT DOCUMENTS

| CN | 101107469 | 1/2008 |
| DE | 4143352 | 7/1995 |

(Continued)

*Primary Examiner* — Tan Le
(74) *Attorney, Agent, or Firm* — Davidson, Davidson & Kappel, LLC

(57) ABSTRACT

A fastening device for fastening an element to the slot of a C-profile rail with a gripping element which can be inserted through the slot into the interior of the profile rail and which can be turned in the profile rail around at least one screw-in axis in such a way that it grips behind the leg of the profile rail that delimits the slot is provided. The gripping element has at least one receptacle that runs perpendicular to the screw-in axis and that serves to secure a threaded rod.

20 Claims, 2 Drawing Sheets

(56) References Cited

U.S. PATENT DOCUMENTS

| | | | | |
|---|---|---|---|---|
| 6,827,531 | B2* | 12/2004 | Womack | B61D 45/001 |
| | | | | 410/104 |
| 6,976,660 | B2* | 12/2005 | Lapointe | G09F 7/18 |
| | | | | 248/218.4 |
| 2002/0048495 | A1 | 4/2002 | Anderson et al. | |
| 2002/0071735 | A1 | 6/2002 | Dinh et al. | |
| 2004/0165965 | A1* | 8/2004 | Unverzagt | F16B 37/045 |
| | | | | 411/84 |
| 2008/0279621 | A1 | 11/2008 | Chaupin | |

FOREIGN PATENT DOCUMENTS

| | | |
|---|---|---|
| EP | 0 210 577 | 2/1987 |
| SU | 415419 | 2/1974 |

\* cited by examiner

FASTENING DEVICE

The invention relates to a fastening device for fastening threaded rods to the slot of a C-profile rail. Such a device is fitted with a gripping element which can be inserted through the slot into the interior of the profile rail and which can be turned in the profile rail around at least one screw-in axis in such a way that it grips behind the leg of the profile rail that delimits the slot.

BACKGROUND

A device of the generic type is disclosed in U.S. Pat. Appln. No. 2002071735 A. It can serve to attach a threaded rod to the slot of a C-profile rail.

SUMMARY OF THE INVENTION

It is an object of the present invention to refine a generic device in such a way that a particularly broad range of use is attained with great reliability and little effort.

A device according to the invention is characterized in that the gripping element has at least one receptacle that runs perpendicular to the screw-in axis and that serves to secure a threaded rod.

The invention is based on the realization that C-profile rails often have several types of openings, namely, on the one hand, the slot running lengthwise along the entire rail but, on the other hand, also often individual passage openings that are arranged in the side walls and in the bottom of the rail. The invention builds upon this and proposes a fastening device with which elements can be easily attached to the slot as well as to the side passage openings. For purposes of attachment to the slot, the device has a gripping element that can be inserted through the slot into the interior of the rail, and subsequently secured to the slot with a positive fit by turning the gripping element around the screw-in axis. For purposes of attachment to the side passage openings, the gripping element, however, also has at least one receptacle in which a threaded rod that runs perpendicular to the screw-in axis can be secured. In this manner, the gripping element can also affix a threaded rod that is inserted laterally into the interior of the rail through a side passage opening. Thus, according to the invention, elements having a wide array of spatial arrangements relative to the rail can be very easily attached to the rail, thereby accounting for a very broad application range.

It is especially preferred for the gripping element to have two receptacles which run perpendicular to the screw-in axis, which serve to secure a threaded rod and which are preferably arranged coaxially on opposite sides of the gripping element. This makes it possible to attach threaded rods to opposite sides of the rail, irrespective of the orientation of the gripping element relative to the rail. As a result, the application range can be expanded even further, while ensuring very simple handling. During proper use, the above-mentioned receptacles are arranged on the side walls of the profile rail. Owing to the preferably coaxial arrangement of the two receptacles, the handling can be made even simpler.

It is likewise preferred for the gripping element to have at least one receptacle that runs parallel, especially coaxially, to the screw-in axis and that serves to secure a threaded rod. These receptacles can serve to secure a threaded rod that runs through the slot into the interior of the rail and/or to secure a threaded rod that runs through the bottom of the rail into the interior of the rail, whereby the term bottom of the rail refers to the rail wall located opposite from the slot. Preferably, the gripping element can have two parallel receptacles which run parallel, especially coaxially, to the screw-in axis, each of which serves to secure a threaded rod and which are preferably arranged coaxially on opposite sides of the gripping element. As a result, the application range can be expanded even further. In other words, preferably four receptacles are provided, whereby adjacent receptacles suitably run at a right angle to each other. In particular, it can be provided that the axes of the receptacles intersect at a common point.

Another practical embodiment of the invention lies in the fact that the gripping element is configured so as to be ring-shaped. This can be advantageous, on the one hand, in terms of the material resources and production effort involved. Moreover, a ring-shaped structure can offer a very high degree of elasticity, which can serve, for instance, to clamp the gripping element in the interior of the rail. At least one of the receptacles, preferably all of the receptacles, is/are suitably configured on the outside of the ring-shaped gripping element.

For example, it can be provided that at least one of the receptacles, preferably all of the receptacles, is/are through holes. Especially when the gripping element is ring-shaped, such through holes can be produced very easily. Fundamentally, however, the receptacles could also be configured as blind holes.

At least one of the receptacles, preferably all of the receptacles, preferably serve(s) to secure a threaded rod with a positive fit. A particularly simple and, at the same time, reliable embodiment is achieved in that at least one of the receptacles, preferably all of the receptacles, has/have an inner thread.

For example, with an eye towards the production effort involved, it can also be advantageous for the gripping element to have a wing nut and a bracket arranged on the wing nut, whereby at least one of the receptacles is arranged on the bracket. The wing nut can serve for attachment to the slot of the rail. Since the additional receptacle is arranged on the bracket, the receptacle does not interfere with the function of the wing nut. The fastening device according to the invention can also be formed exclusively by the bracket according to the invention, without there being a need for a wing nut.

At least one of the receptacles that run perpendicular to the screw-in axis, preferably both receptacles that run perpendicular to the screw-in axis, is/are arranged on the bracket. In addition, one of the receptacles that run parallel to the screw-in axis can be arranged on the bracket, namely, especially the receptacle that is arranged at the bottom of the rail during proper use. The second receptacle that runs parallel to the screw-in axis can be arranged on the wing nut in a structurally very simple manner. It is also particularly advantageous for the receptacles to be arranged on the wing nut and for three of the receptacles to be arranged on the bracket.

Another practical embodiment of the invention lies in the fact that the bracket is fastened to the wing nut by means of a snap closure. This allows the bracket and the wing nut to be delivered to the mechanic separately. If the mechanic needs only an attachment to the rail slot, he/she can employ exclusively the wing nut for this purpose. If an attachment to one of the rail side walls or to the bottom of the rail is called for, then the mechanic can secure the bracket to the wing nut simply by means of the snap closure. As a result, the use of material can be reduced in a particularly user-friendly manner. It is particularly preferred for the wing nut and the bracket to be joined together detachably, especially by means of the snap closure. Fundamentally, the wing nut and the bracket can also be permanently joined to each other, for example, by a press-fit stem.

An especially favorable and, at the same time, reliable embodiment lies in the fact that the snap closure is formed by two claws that are arranged on the bracket and that engage into a receptacle arranged on the wing nut in order to secure a threaded rod. In particular, the claws can be secured with a positive fit to an inner thread arranged in the receptacle. The inner thread thus has a dual function in which it serves to secure a threaded rod on the one hand and the bracket on the other hand.

It is likewise preferred for the fastening device according to the invention to have a clamping plate, especially one made of an elastic material, for placement on the outside of the C-profile rail. This clamping plate can serve to press the gripping element onto the leg of the rail, especially in a pre-assembly position of the device.

The invention also relates to an arrangement consisting of a fastening device according to the invention and of a C-profile rail on whose legs the fastening device is secured, preferably with a positive fit.

In particular, the fastening device can provide a thread for attaching standard threaded rods to several sides of the rails. Here, the fastening device can be inserted through the slot of the rail in any desired position along the rail. In a pre-assembly position, the fastening device can be moved along the rail with very little effort, whereby the fastening device is, at the same time, secured against undesired movements. This is made possible by a fixation means that consists, on the one hand, of the clamping plate that holds the device on the outside of the rail and, on the other hand, of teeth which are located on the top of the gripping element and which correspond to teeth located on the legs of the rail.

BRIEF DESCRIPTION OF THE DRAWINGS

The term threaded rod can refer to any rod having an outer thread, at least in some sections. The threaded rod can also form the shank of a screw, that is to say, the receptacles according to the invention can also be provided to secure a screw consisting of a head and a threaded rod.

The invention will be explained in greater detail below on the basis of a preferred embodiment that is schematically depicted in the accompanying figures. The figures schematically show the following.

DETAILED DESCRIPTION

Figure 1:
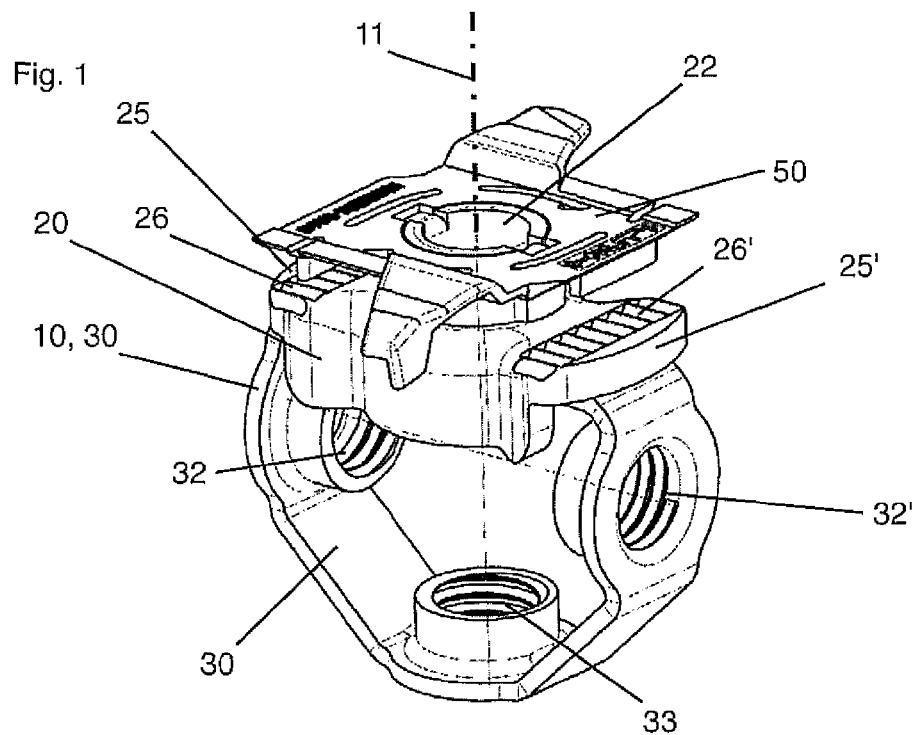
FIG. 1 a perspective view of an embodiment of a fastening device according to the invention.

An embodiment of a fastening device according to the invention is shown in FIGS. 1 to 4.

The fastening device has a gripping element 10 including a wing nut 20 and a bracket 30. The gripping element 10 and/or the bracket 30 can be inserted through the lengthwise slot 91 of the C-profile rail 90 shown in FIG. 4 into the interior of the rail 90, and then, through the rotation around the screw-in axis 11, the gripping element 10 and/or the bracket 30 can be brought into the position shown in FIG. 4, in which it or they grip behind the legs 92 and 92' of the rail 90 bordering the lengthwise slot 91 of the rail 90, so that the gripping element 10 is secured to the slot 91 with a positive fit.

The fastening device also has a clamping plate 50 that is arranged on the gripping element 10. In the embodiment shown, the clamping plate 50 is made of an elastic plastic. However, it can also be made of metal and be coupled to the gripping element 10 via a spring. The clamping plate 50 acts upon the outside of the rail 90 when the gripping element 10 has been screwed into the rail 90 and it forces the gripping element 10 against the legs 92. 92', so that a pre-assembly position is established in which the fastening device can only be moved along the rail if a certain amount of force is applied.

Figure 2:
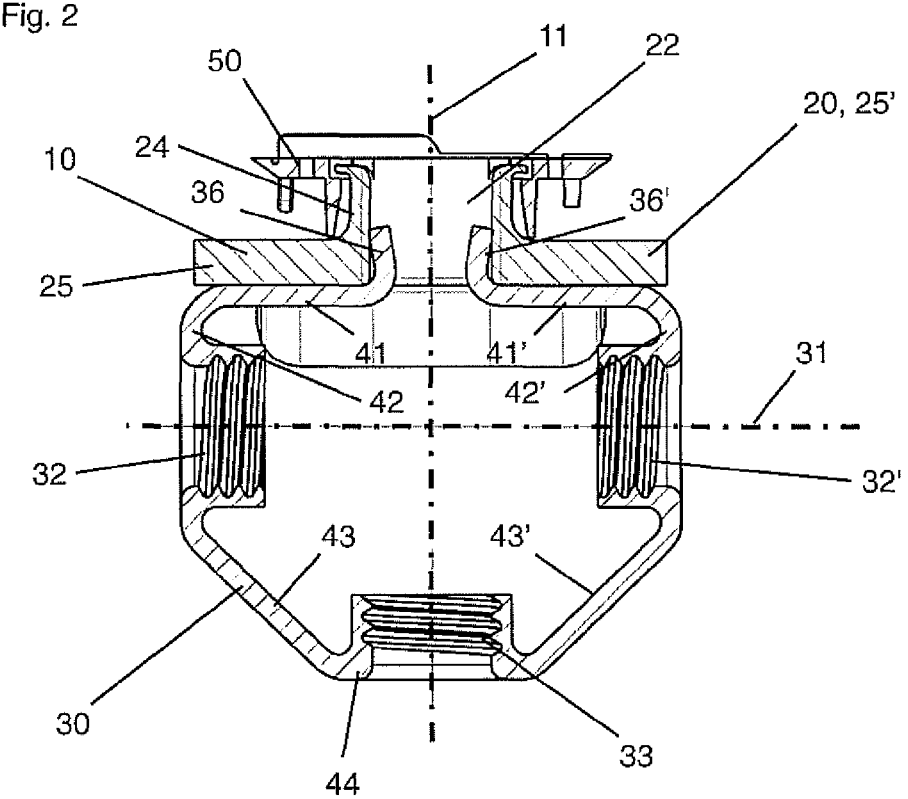
FIG. 2 a sectional view of the fastening device of FIG. 1.
Figure 3:
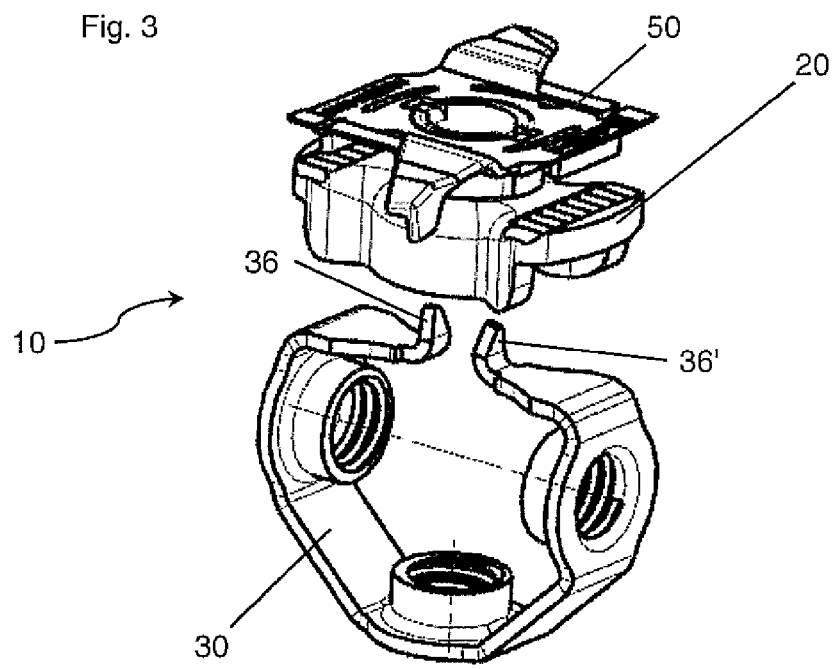
FIG. 3 an exploded view of the fastening device of FIG. 1.
Figure 4:
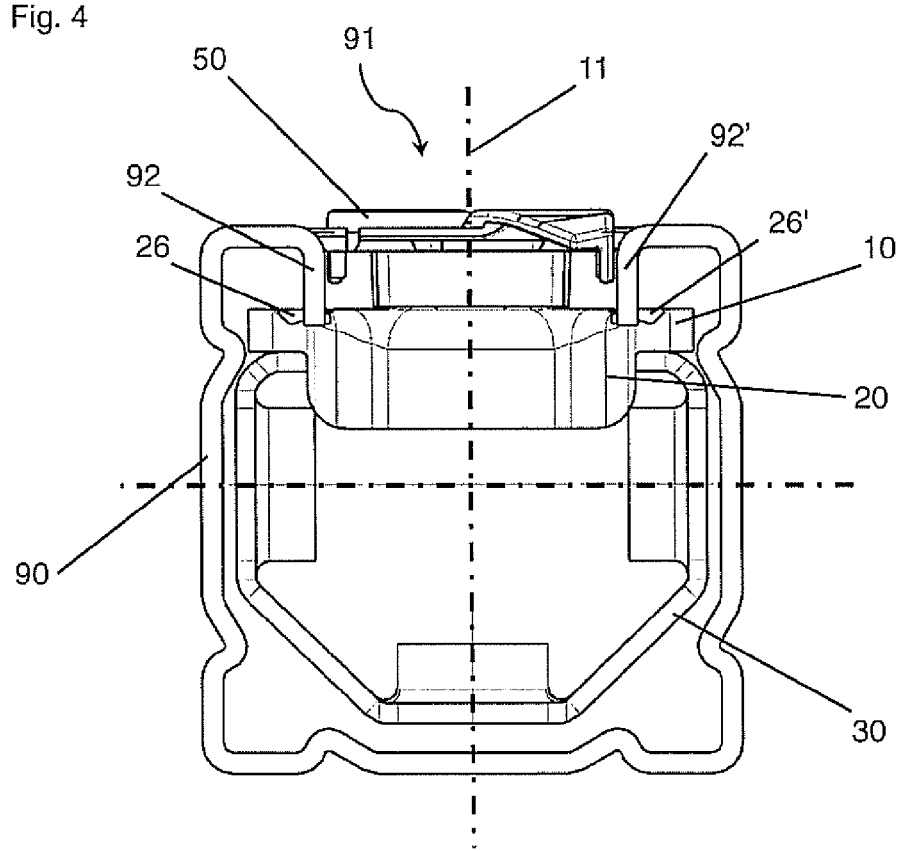
FIG. 4 a side view of the fastening device of FIG. 1, inserted into a C-profile rail.

As can specially be seen in FIGS. 1 and 2, the wing nut has a central collar 24 through which the screw-in axis 11 runs, as well as two wings 25 and 25' that protrude from the collar 24 on opposite sides of the collar 24 perpendicular to the screw-in axis 11. As can especially be seen in FIG. 1, a toothed section 26 or 26' is formed on each of the wings 25, 25', respectively. When the gripping element 10 shown in FIG. 4 is in the screwed-in position, the toothed sections 26 or 26' are each in contact with a leg 92 or 92' and they increase the resistance against a lengthwise movement by the gripping element 10 in the rail 90.

The gripping element 10 has a total of four receptacles that serve to hold and secure a threaded rod with a positive fit: a first receptacle 22 is situated in the collar 24 of the wing nut 20 and it runs all the way through the collar 24 of the wing nut 20. Three other receptacles, namely, two side receptacles 32 and 32' as well as a lower receptacle 33, are located in the bracket 30. The first receptacle 22 in the wing nut 20 as well as the lower receptacle 33 of the bracket 30 are arranged coaxially with respect to each other and especially coaxially relative to the screw-in axis 11 on opposite sides of the gripping element 10. The two side receptacles 32 and 32' are likewise arranged coaxially with respect to each other on opposite sides of the gripping element 10, whereby the axis 31 of these side receptacles 32 and 32' intersects the axis 11 of the two other receptacles 22 and 33 at a right angle (see FIG. 2).

The receptacles 22, 32, 32' and 33 each have an inner thread that corresponds to the threaded rod, whereby, for the sake of clarity, the inner thread of the receptacle 22 is not shown in the figures. The receptacles 32, 32' and 33 formed on the bracket 30 are configured as cutouts that face towards the interior of the bracket, that is to say, they each have a collar that faces towards the interior of the bracket.

The bracket 30 can preferably be detachably joined to the wing nut 20 by means of a snap closure. This snap closure has two claws 36, 36' that are formed at the end of the bracket 30 and that, when the snap closure is closed, are secured in the upper receptacle 22 on an inner thread there—if such a receptacle 22 is present.

As can specially be seen in FIG. 2, the bracket 30 is configured so as to be mirror-symmetrical. It has two upper webs 41, 41', two side webs 42 and 42', two connecting webs 43 and 43' as well as a lower web 44. The two side receptacles 32 and 32' are formed on the two side webs 42 and 42'. Each side web 42 and 42' is adjacent to an upper web 41, 41' on one side, and adjacent to connecting webs 43 and 43' on the other side, whereby the two connecting webs 43 and 43', in turn, are joined via the lower web 44. The two claws 36, 36' are arranged on the upper webs 41, 41', namely, on the side of the appertaining upper web 41 or 41' that is opposite from the appertaining side web 42 or 42'.

The two upper webs 41, 41' are arranged so as to be coplanar and they run perpendicular to the screw-in axis 11. The two side webs 42 or 42' protrude perpendicularly from the appertaining upper web 41 or 41' and/or they run parallel to the screw-in axis 11. The connecting webs 43 and 43' protrude at an acute angle, especially at an angle of 45°, from the appertaining side web 42 or 42'. This arrangement can facilitate the insertion and screwing-in procedure into the rail 90.

What is claimed is:

1. A fastening device for fastening an element to a slot of a C-profile rail, the fastening device comprising:
   a gripping element insertable through the slot into an interior of the profile rail turnable in the profile rail around at least one screw-in axis to grip behind at least one leg of the profile rail delimiting the slot, the gripping element having at least one receptacle running perpendicular to the screw-in axis for securing a threaded rod;
   wherein the gripping element includes a wing nut and a bracket arranged on the wing nut, the at least one receptacle being arranged on the bracket.

2. The fastening device as recited in claim 1 wherein at least one receptacle includes two receptacles.

3. The fastening device as recited in claim 2 wherein the two receptacles are arranged coaxially on opposite sides of the gripping element.

4. The fastening device as recited in claim 1 wherein the gripping element has at least one further receptacle running parallel to the screw-in axis for securing a further threaded rod.

5. The fastening device as recited in claim 4 wherein the at least one further receptacle is coaxial to the screw-in axis.

6. The fastening device as recited in claim 4 wherein the at least one further receptacle includes two parallel receptacles arranged coaxially on opposite sides of the gripping element.

7. The fastening device as recited in claim 6 wherein the two parallel receptacles are coaxial to the screw-in axis.

8. A fastening device for fastening an element to a slot of a C-profile rail, the fastening device comprising:
   a gripping element insertable through the slot into an interior of the profile rail turnable in the profile rail around at least one screw-in axis to grip behind at least one leg of the profile rail delimiting the slot, the gripping element having at least one receptacle running perpendicular to the screw-in axis for securing a threaded rod;
   wherein the gripping element is configured so as to be ring-shaped, the at least one receptacle or a further receptacle parallel to the screw-in axis is configured on an outside of the ring-shaped gripping element.

9. The fastening device as recited in claim 1 wherein at least one of the receptacles or a further receptacle parallel to the screw-in axis is a through hole, and at least one of the receptacles or the further receptacle has an inner thread.

10. The fastening device as recited in claim 1 wherein a further receptacle parallel to the screw-in axis is arranged on the bracket.

11. The fastening device as recited in claim 10 wherein one additional receptacle is arranged on the wing nut and two of the receptacles and the further receptacle are arranged on the bracket.

12. The fastening device as recited in claim 1 wherein the bracket is fastened to the wing nut via a snap closure.

13. The fastening device as recited in claim 12 wherein the snap closure is formed by two claws arranged on the bracket and engaging into a receptacle arranged on the wing nut in order to secure a further threaded rod.

14. The fastening device as recited in claim 1 further comprising a clamping plate for placement on an outside of the C-profile rail.

15. The fastening device as recited in claim 14 wherein the clamping plate is made of made of an elastic material.

16. An arrangement comprising:
   the fastening device as recited in claim 1; and
   the C-profile rail, the fastening device secured with a positive fit to the legs of the C-profile rail.

17. The fastening device as recited in claim 1 wherein the at least one receptacle has an inner thread.

18. The fastening device as recited in claim 1 where the at least one receptacle defines a receptacle axis, the receptacle axis being perpendicular to the screw-in axis.

19. The fastening device as recited in claim 8 wherein the at least one receptacle has an inner thread.

20. The fastening device as recited in claim 8 where the at least one receptacle defines a receptacle axis, the receptacle axis being perpendicular to the screw-in axis.

* * * * *